United States Patent [19]

Wegner

[11] Patent Number: 5,095,926
[45] Date of Patent: Mar. 17, 1992

[54] APPARATUS FOR WASHING STORAGE BATTERIES

[76] Inventor: Paul C. Wegner, 1340 Eaton Ave., San Carlos, Calif. 94070

[21] Appl. No.: 559,693

[22] Filed: Jul. 30, 1990

Related U.S. Application Data

[62] Division of Ser. No. 465,952, Jan. 16, 1990, Pat. No. 5,034,065.

[51] Int. Cl.$^5$ .............................................. B08B 3/02
[52] U.S. Cl. ................................ 134/64 R; 134/111; 134/122 R; 134/198
[58] Field of Search ................. 134/102, 64 R, 122 R, 134/60, 198, 72, 111

[56] References Cited

U.S. PATENT DOCUMENTS

| | | | |
|---|---|---|---|
| 766,365 | 8/1904 | Lough | 134/109 |
| 2,564,798 | 8/1951 | Allensworth | 134/111 |
| 2,651,065 | 9/1953 | O'Connor | 134/64 R X |
| 2,911,457 | 11/1959 | Sabatino et al. | 134/2 |
| 3,076,730 | 2/1963 | Nolte | 134/72 |
| 3,167,196 | 1/1965 | Eberle | 134/72 X |
| 3,868,272 | 2/1975 | Tardoskegy | 134/72 X |
| 3,929,409 | 12/1975 | Buchner et al. | 134/64 R X |
| 3,938,214 | 2/1976 | Hodsden et al. | 134/64 R X |
| 4,325,415 | 4/1982 | Miller, Jr. | 134/152 X |
| 4,572,746 | 2/1986 | Wegner | 134/76 |
| 4,652,381 | 3/1987 | Inglis | 210/722 X |
| 4,846,202 | 7/1989 | Kallweit | 134/122 R |
| 4,951,694 | 8/1990 | Hone et al. | 134/64 R X |

FOREIGN PATENT DOCUMENTS 3039303  5/1981  Fed. Rep. of Germany .... 134/64 R Primary Examiner—Frankie L. Stinson
Attorney, Agent, or Firm—Frank J. Benasutti

[57] ABSTRACT

An apparatus for washing storage batteries comprises a rinse section for removing water soluble acid, followed by a wash section to remove non-soluble contaminants. The water in the rinse section is isolated from the water in the wash section. Means are provided for collecting acid solution from the rinse section, and for filtering and recycling the water in the wash section. Batteries are moved through the sections in sequence on a carrier. In a preferred embodiment, the rinse section comprises a partitioned collecting pan underlying the carrier to create sequential rinsing in progressively less acidic rinse water and to concentrate the most acidic rinse water before the first partition for extraction as an acid solution. A drying section using air blowers along the carrier may be included after the washing section.

11 Claims, 3 Drawing Sheets

APPARATUS FOR WASHING STORAGE BATTERIES

This application is a division of U.S. Ser. No. 07/465,952 filed Jan. 16, 1990 now U.S. Pat. No. 5,034,065.

BACKGROUND OF THE INVENTION

This invention relates to the manufacture of storage batteries, and in particular relates to washing and drying the completed batteries prior to shipment in order to remove acid and dirt deposited on the battery surface.

Manufacturing storage batteries causes the battery surfaces to collect various contaminants. The primary contaminant is battery acid, which is deposited on the battery surface by gassing and bubbling of the electrolyte during battery charging. Lead dust, grease, and other types of dirt are also deposited on the battery surface during manufacture. Hence, it is common industry practice to wash the batteries before shipping to remove the contaminants and give the battery a clean appearance.

Prior art battery washers typically involve a conveyor system with water spray nozzles and brushes, followed by an evaporative dryer. Soap is usually added to the water to lift the insoluble dirt from the battery surface. The soap usually contains a highly alkaline material to neutralize acid from the battery, but the soap is then made less effective by the salts resulting from the neutralization process.

While the prior art wash systems are effective in cleaning batteries, they consume large amounts of water and soap, which becomes contaminated waste water requiring treatment before disposal or reuse. They also require a significant expenditure of heat energy, and do not reclaim any of the electrolyte acid.

A somewhat analogous situation existed in the practice of washing dry-charge battery plates, which I addressed in my U.S. Pat. No. 4,572,746. That patented process remedied the waste of formation acid, and the by-products of large volumes of contaminated waste water and hazardous solid waste sludge, which existed in the prior art processes which proceeded it. Persons interested in the full particulars of that process are urged to read the patent in its entirety, but in general terms, it includes washing the formed plates first in a slow-flow tank to remove the majority of acid, and then re-washing the plates in a fast-flow rinse tank to remove the residual acid. The wash water in the slow-flow tank effectively removes the acid from the plates. The resulting highly acidic solution is pumped from the wash tank to a holding tank for use, such as making new electrolyte for wet battery production or making re-package acid. Conversely, the relatively low acidity in the fast-flow tank allows that water to be purified in an ion exchange bed and recycled in the wash system. Thus, most of the acid is reclaimed for further use, while the amount of contaminated water and solid waste sludge is greatly reduced.

An objective in the present invention is to achieve similar economy in the washing completed batteries. That is, I seek to reclaim and then reuse the electrolyte acid to the extent practical, to filter and regenerate the wash water for continuous reuse in the wash system, and to dry the batteries with a reduced expenditure of energy. These objectives, and the manner in which they are achieved, will be more fully understood in the description which follows.

As a generalized example, the particular embodiment of the invention described herein is estimated to reduce water and soap consumption by 100 fold, and reduce combined electrical and heat consumption by 10 fold, over comparable prior art washing systems. It will reclaim over 99% of the electrolyte acid, in only 40 gallons of wash water per 4,000 batteries, while maintaining an output of 10 batteries/min. This 40 gallons of wash water contains the reclaimed electrolyte in an approximately 5% acid concentration, and is recycled as an acid solution which can be used to make new electrolyte. The apparatus operates at wash water temperatures of 80°-100° F., and dries the batteries with room temperature air only.

It should be noted that although the described apparatus is directed to washing storage batteries, the same principles can be used for other articles in which washing is used to remove both non-soluble dirt and water soluble acids or salts, such as with semiconductor chips, "pickled" steel, and like articles. However, some variations would likely have to be made in the carrier, rinse station configuration and number, brushes and other components necessary to accommodate the different size, shape and acid content of such articles.

DETAILED DESCRIPTION OF THE PREFERRED EMBODIMENT

Figure 1:
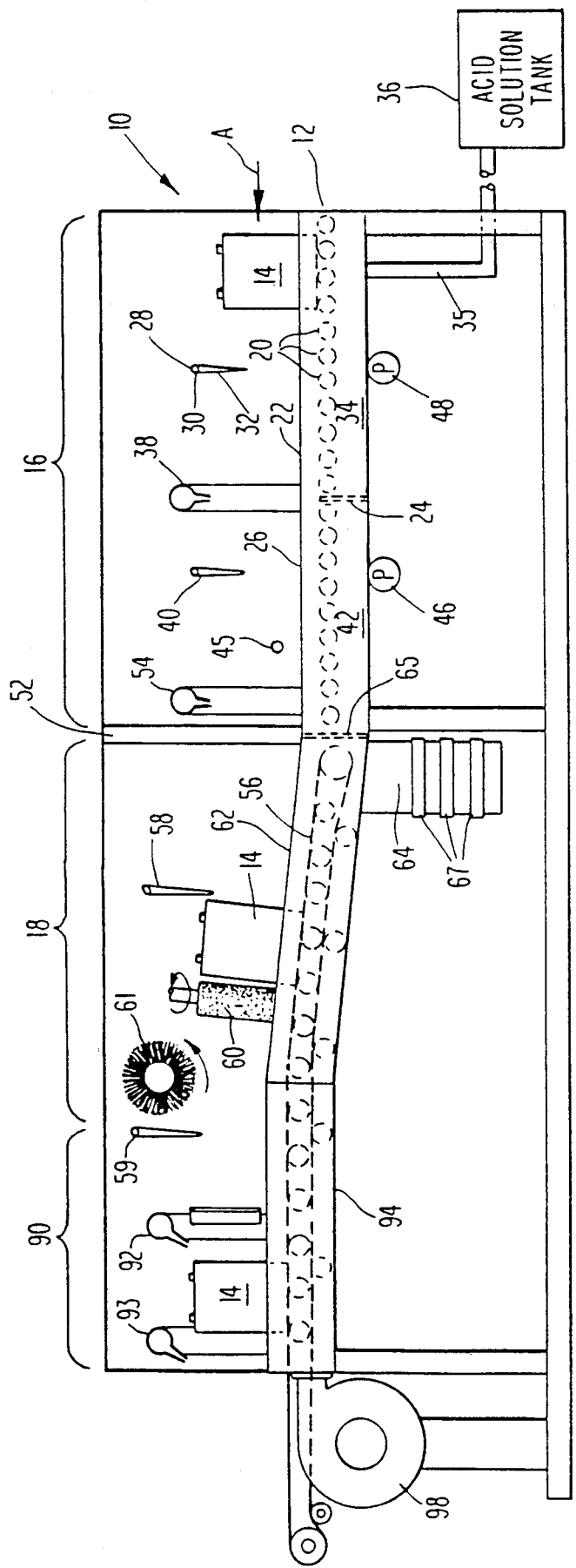
FIG. 1 is a perspective view of a preferred embodiment apparatus for washing and drying batteries (with the enclosing sheet metal hood removed).

Although a specific form of the invention has been selected for illustration in these drawings, and the following description is therefore directed to describing that form shown in the drawings, the description is not intended to limit the scope of the invention. The invention is defined in the appended claims.

FIG. 1 illustrates a preferred embodiment of an apparatus 10 for washing and drying storage batteries. The apparatus is enclosed in a sheet metal hood (not depicted). The apparatus 10 includes a carrier 12 to move the batteries 14 through the washing and drying sequence. Washing is carried out in two separate sections of the apparatus, one section 16 for water soluble material and the next section 18 for non-soluble material. The first section 16 removes approximately 99% of adhering acid and water soluble salts from the battery surface into approximately only 40 gallons of water per 4,000 batteries. The second section 18 removes non-water soluble dirt, such as grease and lead dust. The wash and rinse waters of the two sections are isolated from each other, for reasons that will be apparent upon further description.

Considering first the soluble material wash section 16, the battery carrier 12 is a series of driven rubber rollers 20 extending over a rinse water collection pan 22. The pan 22 is divided by a partition 24 into two sections 34,42. The partition height is below that of the sidewalls 26 of the pan 22, so that rinse water can overflow the partition 24 without overflowing the sidewalls 26.

Figure 3:
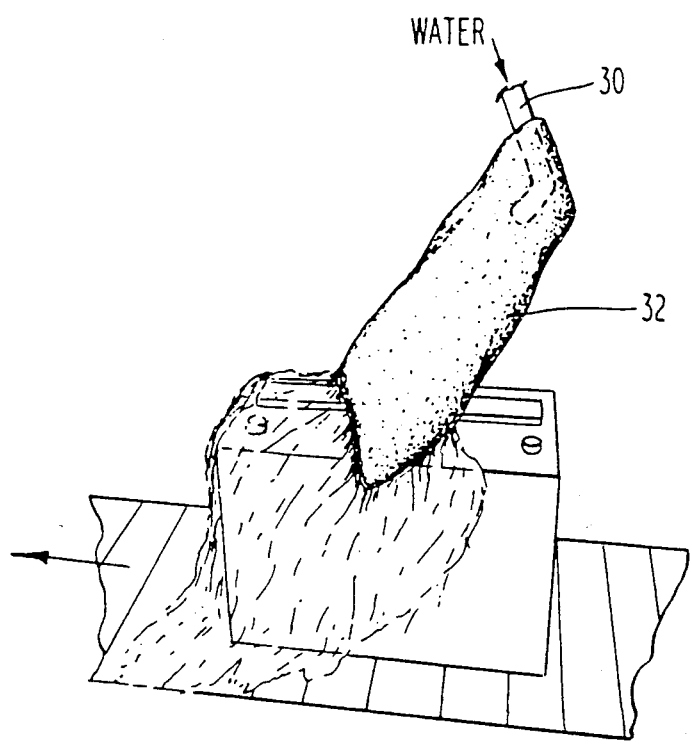
FIG. 3 is a perspective view of a polyester felt bag rinse station.

Each battery enters the wash apparatus by being placed on the carrier 12 at position A, and is carried to a first rinse station 28, depicted more fully in FIG. 3, where it receives a slow-flow water rinse to remove battery acid and water soluble salts. As shown in FIG. 3, such slow-flow is achieved by a water pipe 30, draining at a rate of approximately 1-2 gallons per minute into a polyester felt bag 32. The bag width is slightly wider than the narrow axis of the battery, and its length is such that it drags across the battery as the battery is carried beneath it. Rinse water trickles from the bottom of the felt bag 32, across the battery's top and down its sides, removing most of the adhering battery acid and salts. The rinse water then falls into the collection pan 22 to the right of the partition 24 in FIG. 1. Hereafter, this side 34 of the pan, to the right of the partition 24, shall be referred to as the "high acidity" reservoir 34.

It is unnecessary to use a rapid flow of neutral pH wash water to remove concentrated acid or dissolve salt deposits. The majority of such materials will be removed by relatively highly acidic water, particularly if used in conjunction with the rinse-water blow-off stations, as described hereafter. It is therefore advantageous to use a slow-flow of rinse water, and recycle this rinse water to the rinse station, which causes the rinse water to attain a relatively high acidity. This reduces the total volume of rinse water required, and creates a concentrated acid solution which can be later used for other applications. In the present embodiment, rinse water in the high acidity reservoir 34 of the collecting pan typically attains an acid concentration of approximately 5%, and is drained from the high acidity reservoir 34 at a rate of approximately 0.1 gallons per minute through a pipe 35 to a tank 36, from which it can be periodically withdrawn and used again as battery electrolyte after cutting with fresh acid solution. Since no soap is used in the rinse, the solution can be reused for that purpose.

Following the first rinse station 28, the battery passes through a blow-off station 38, mounted over or slightly before the collection pan partition 24. Its purpose is to blow the diluted acid water droplets off the battery before it crosses the partition, for reasons described in greater detail below.

Downstream, to the left of the blow-off station 38, is a second rinse station 40, which is identical to the first rinse station 28 in that it is also a polyester felt bag and water pipe arrangement as depicted in FIG. 3. Its associated portion of the collection pan, to the left of the partition 24, is referred to hereafter as the "low acidity" reservoir 42. The second rinse station 40 will remove approximately 90% of any battery acid and salts which still remain after the first rinse station 28. Such washing in sequential stages, using progressively lower acidity rinse water in the later stages, removes virtually all of the water soluble materials. If required, another rinse with yet a lower acidity rinse water could be accomplished by adding another rinse station, blow-off and partition.

When the second stage rinse water accumulates in the low acidity reservoir 42 to the partition 24 height, it flows across the partition 24 to become feed water for the first stage rinse. This "current" of rinse water across the partition moves from the low acidity reservoir 42 to the high acidity reservoir 34, while the batteries move "counter-current" on the carrier from a high acidity rinse to a lower acidity rinse. For optimum acid removal in the second rinse, it is therefore advantageous to keep the acidity differential across the partition 24 as high as practical.

Figures 4, 5:
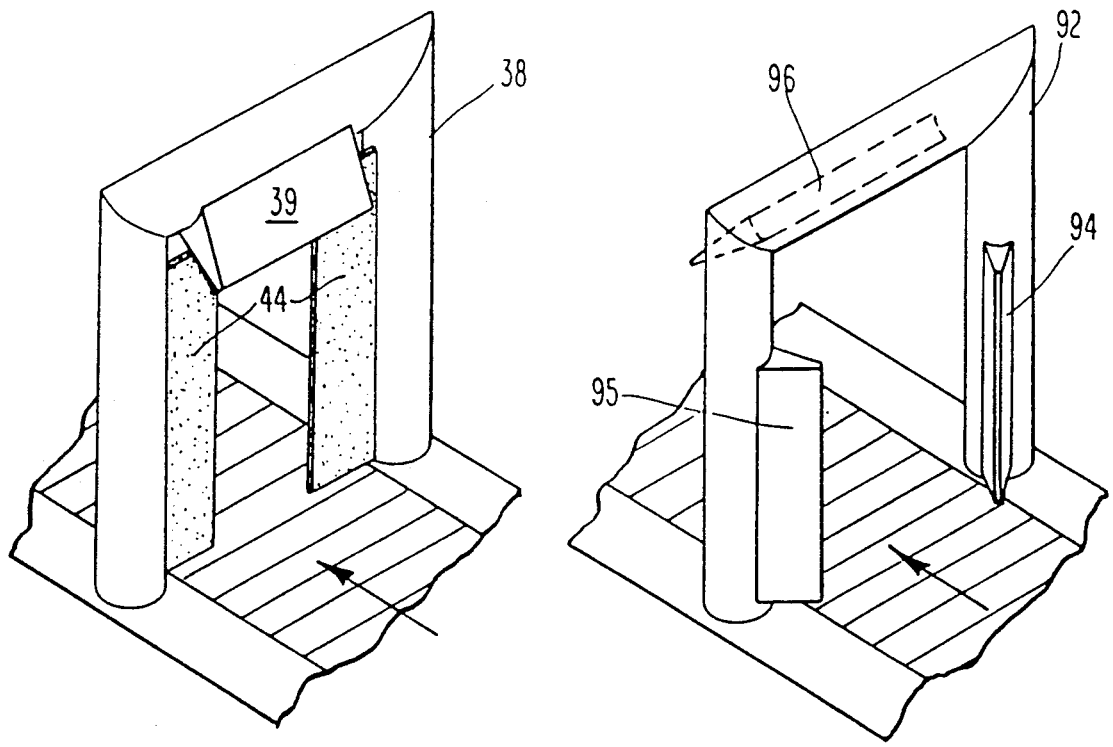
FIG. 4 is a perspective view of a blow-off station in the wash section.
FIG. 5 is a perspective view of blowers in the dryer section.

The blow-off stations are important in maintaining the differential. The majority of the acid on the battery is removed into the high acidity reservoir 34 by the first rinse, as described previously, but the large surface area and contour of storage batteries tends to "drag-out" a significant amount of diluted acid as droplets and surface film. If not removed, this would soon reduce the acid differential of the rinse water between the two reservoirs of the partition. Consequently, the battery is passed through the blow-off station 38 before crossing the partition 24. The blow-off stations 38 comprises an air duct with a wedge shaped nozzle 39 positioned at its top, and rubber air dams 44 at its inside where the batteries pass through, as depicted in FIG. 4. Air flow is directed by the wedge nozzle 39 down and across the battery and blows the surface water back into the high acidity reservoir 34 of the collection pan. The rubber air dams 44 press against the sides of the battery as deflection shields to keep droplets from being swirled by the air flow into the low acidity reservoir 42 of the collection pan. Consequently, most of the "drag-out" of acid is eliminated, and as shown by the comparison tables which follow, the efficiency of each rinse section's efficiency in removing acid is greatly increased.

Referring again to FIG. 1, fresh wash water is introduced through an inlet pipe 45 at approximately 0.1 gallon per minute into the low acidity reservoir 42 of the collection pan. The low acidity reservoir 42 serves as the reservoir for its associated rinse station 40. A pump 46 provides circulation at a rate of 1-2 gallons per minute back to the water pipe of the rinse station 40. The relatively low acid rinse water solution in reservoir 42 overflows the partition 24 at the 0.1 gallon per minute input rate, and becomes the feed water for the high acidity reservoir 34. Similarly, the high acidity reservoir 34 of the pan serves as the reservoir for its associated rinse station 28, with its circulation provided by a pump 48 also at 1-2 gallons per minute. Rinse water is removed from the high acidity reservoir 34, at a rate (0.1 gpm) equal to the input of fresh water to the low acidity reservoir 42, via an inlet pipe 45, causing the slow current (0.1 gpm) across the partition 24 in a direction counter to the movement of the batteries. This current keeps the rinse waters segregated by preventing diffusion from high acid solution to the low acid solution across the partition. As explained previously, the acidic rinse water withdrawn from the system is routed to a tank 36 for later cutting and reuse as electrolyte. Thus, by having the soluble rinse section 16 as described, I accomplish my objective of reducing the amount of water used, and contaminated water to be disposed. The relatively small amount of water required in this wash section (approximately 0.1 gpm) is entirely reused in a productive manner, along with the electrolyte acid reclaimed in it.

The second sequential wash section 18 removes water insoluble dirt and any remaining small trace of acid. This section 18 is isolated by a barrier 52 from the previous section 16 for removing soluble materials. The batteries pass through a second blow-off station 54 (identical to station 38, as in FIG. 4) prior to passing through the barrier 52, so that water droplets containing acid solution are blown back into the low acidity reservoir 42, and are prevented from entering the insoluble dirt section 18 of the wash.

The carrier 12 in the non-soluble wash section 18 is a conveyor belt 56, as depicted in FIG. 1, which moves each battery progressively through rinse stations 58,59 and brushes 60, 61 as depicted. The rinse stations 58,59 are again polyester felt bags identical to the earlier rinse stations (30,40) as depicted in FIG. 3. Bags are preferred here instead of high velocity spray nozzles in order to accomplish the objective of reducing heat energy costs, but have the added advantage of eliminating nozzle clogging. Rinse water of approximately 3 gallons per minute, at temperatures in the range of approximately 80°-100° F., can be maintained with less heat energy input by eliminating the evaporative heat loss associated with spray nozzles. The brushes 60, 61 provided sufficient mechanical agitation for dirt removal, hence high velocity spray is not required. Any remaining acid (normally less than 1% of the original concentration) is removed in this section.

The conveyor belt 56 is inclined at a shallow angle, rising in elevation in the direction of battery movement. Beneath the conveyor 56 is a similarly angled collection tank 62, which directs the rinse water into a surge tank 64. The collection tank 62 is isolated from the collection tank 22 of the soluble material section by a partition 65. The surge tank 64 contains a circular-band electric heater 66 to maintain water temperatures as indicated above.

The wash water in the non-soluble dirt section 18 is completely isolated from the water in the soluble material section 16. A wetting agent soap, such as Triton X 100 or FSN perfluoro surfactant, is added to the water in section 18 to assist the removal of non-soluble dirts, particularly grease. The wetting agent causes a thin film of water on the battery to facilitate blow-drying. Since the wash water remains relatively salt-free, the soap is more effective than it would be if both soluble and non-soluble materials were removed in the same rinse, or if alkaline material were added to neutralize acid. The salt-free water also eliminated the likelihood of spotting by salt deposits after drying, or the necessity of a final fresh water rinse before drying to eliminate spotting.

Figure 2:
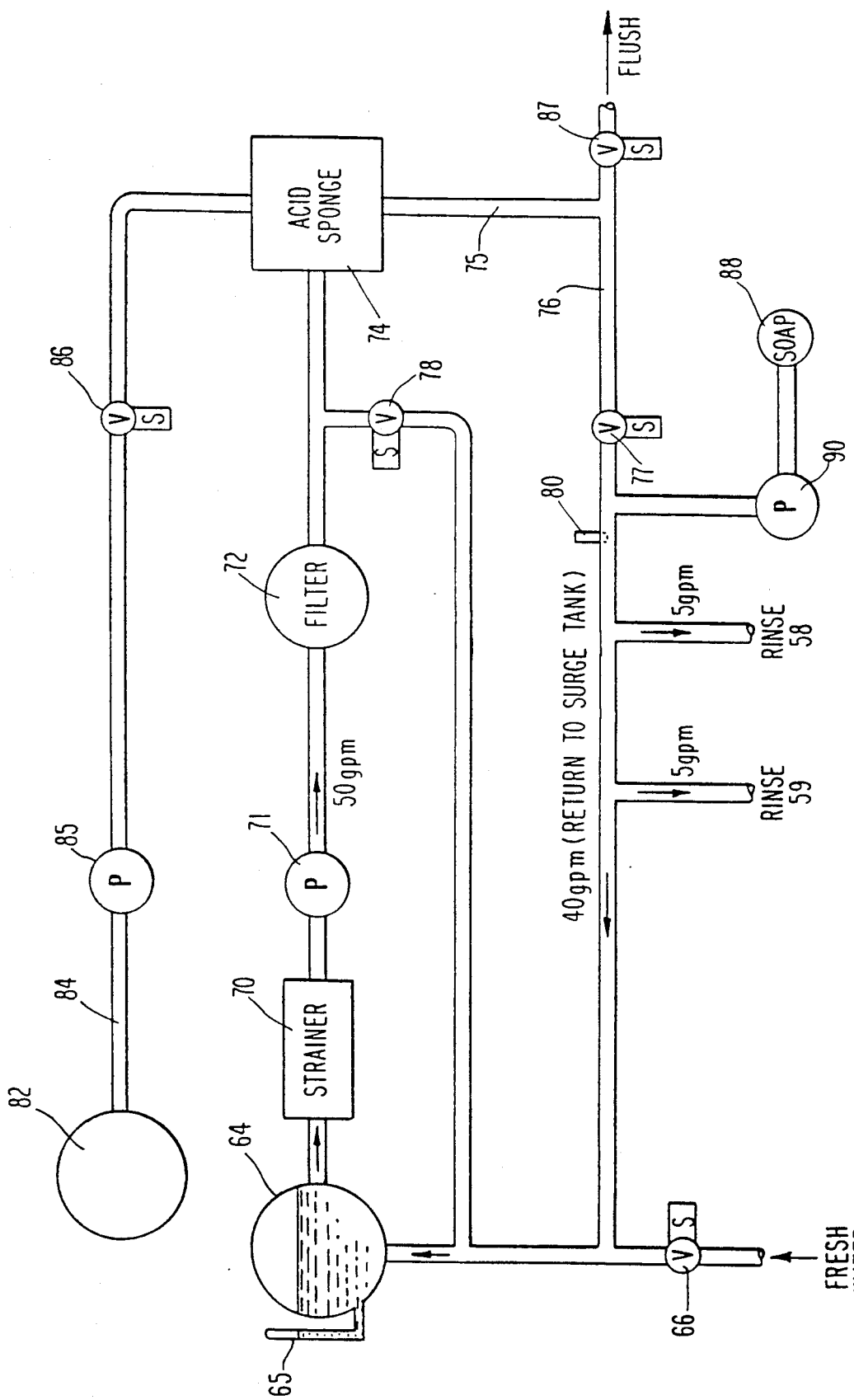
FIG. 2 is a schematic illustration of the wash water filtering and regeneration system of the non-soluble dirt wash section.

Turning now to FIG. 2, the surge tank 64 has a connected vertical float switch pipe 65. The principle of operation of the float switch pipe 65 is well known to those in the art. Since the pipe is opened to the surge tank, the water level in the pipe is the same as that in the tank. A float in the pipe makes contact with a switch when the water level drops below a selected height, and provides an electrical signal. In this application, the electrical signal from the switch operates a solenoid control valve 66 to allow replenishment water from a fresh water source, in this instance a domestic city water connection.

Water in the surge tank 64 is heated by the electric heater 67 (shown in FIG. 1) to 80°-100° F. and is pumped by a 1-hp pump 71 at approximately 50 gpm through a strainer basket 70 to a particle filter, which in this embodiment is a diatomaceous earth filter 72 similar to that used in home swimming pools. As well known to persons familiar with such filters, its purpose is to remove small particulate matter from the water flowing through it.

After passing through the diatomaceous earth filter 72, the water is passed to a 1.5 cubic foot ion exchange resin bed or "acid sponge" 74. The purpose of the acid sponge 74 is to capture any trace of battery acid which remains after the soluble wash section 16. After passing through the acid sponge 74, the rinse water is discharged through a pipe 75 into a manifold 76. A solenoid controlled valve 77 is normally opened and allows the rinse water to pass into the manifold 76. However, valve 77 operates in conjunction with another solenoid controlled valve 78 in a return line 79 between the diatomaceous filter 72 and the surge tank 64. Valve 78 is normally closed, causing the rinse water to pass through the acid sponge 74, and exit through valve 77 into manifold 76. When valve 77 is closed, and valve 78 is simultaneously opened, the rinse water no longer passes through the acid sponge 74, but rather goes directly from the diatomaceous earth filter 72 back to the surge tank 64. The purpose of this alternate return route is to keep the earth particles from entering the acid sponge when the diatomaceous earth is being removed and replaced.

In normal operation, water from manifold 76 is divided into flow to the rinse stations 58, 59 and flow back to the surge tank 64. A balance valve 80 regulates the division of flow such that approximately 20% (10 gpm) passes to the combined rinse stations (approximately 5 gpm each), while approximately 80% (40 gpm) returns to the surge tank 64. Consequently, the water is continually recirculated from the surge tank through the particle filter 72 and acid sponge 74 at a ratio of approximately 4:1 to its flow through the rinse stations 58,59, causing it to be filtered, and any trace acid absorbed, several times before it is recontaminated by a battery.

This closed system removes non-soluble dirt from the battery without generating any water which is significantly contaminated either by acid or hazardous particulate matter such as lead. In the described embodiment, it should only be necessary to periodically replace the diatomaceous earth in the filter 72 at periods of approximately 3 months, and to regenerate the acid sponge 74 at a frequency of approximately 7 weeks.

A pH probe 80 attached to the manifold 76 indicates the relative acidity of the water leaving the ion exchange resins. When the pH reading approaches a level (below approximately 5 pH) which indicates that the sponge 74 is becoming less effective in removing acid from the water, the sponge 74 may be regenerated by flushing with a caustic solution to return the resins to a highly basic state. A five gallon tank 82 of 50% caustic solution is connected by a pipe 84, through parastolic pump 85 and solenoid valve 86, to the acid sponge 74. To regenerate the acid sponge, the valve 86 is opened, while simultaneously valve 77 is closed, and a flush valve 87 is opened. Water from the surge tank 64 is thereafter pumped through the acid sponge 74, and via valve 87 exits the acid sponge 74 to a sewer or outside holding pond. The 50% caustic solution is pumped onto the resins via pump 85 and valve 86 during the first part of the flush. In addition to regenerating the resins, the caustic neutralizes the waste water in the sewer or holding pond.

A soap reservoir 88 is filled with the wetting agent soap as described previously, and such soap is pumped through parastolic pump 90 into manifold 76 as needed to replenish the soap level in the rinse water. Since the rinse water with soap is recirculated in the closed system, it is only necessary to add small quantities of soap from reservoir 88 at infrequent intervals.

It will be seen from the above that in this section of the apparatus I have further contributed to my objective of not using large quantities of water or soap, and not producing large quantities of contaminated hazardous waste water. The water in the system is continuously used for long periods of time, and when discarded is relatively free of acid or hazardous solid matter. Moreover, I have accomplished my objective regarding heating costs by using slowly flowing water at the rinse stations, which does not dissipate heat rapidly. In addition, by this and the preceding section, I have accomplished the primary washing objective of removing both the non-soluble and soluble materials from the battery surface.

The battery is now passed by the conveyor belt 56 into the dryer section 90.

I have found that a more energy efficient drying is accomplished by blowing moisture from the battery surface with room temperature air than by evaporating it with heat. To facilitate this, I have used a wetting agent soap, such as Triton X 100 or FSN perfluoro surfactant, in the non-soluble wash section 18, which has the effect of leaving a thin film of water that is easily blown off and dried by the depicted blowers 92, 93, works in conjunction with the wetting agent soap and air blowers 92, 93 to rapidly dry the battery.

COMPARISON OF RESULTS

Through tests and calculations, I have attempted to compare various aspects of the wash system with other wash systems. Table A shows a comparison of the water requirements and acid removal performance of four systems. The first two are in accordance with the present invention; System 1 being the "counter-current" slow-flow of a two-stage rinse, without blow-off between the two rinses, while System 2 is identical to system 1 except for the addition of the blow-off between rinses to eliminate acid "drag out". System 3 uses high velocity water spray to clean the batteries. System 4 uses high pressure steam to clean the batteries. Both system 3 and 4 use substantially more water and energy than systems 1 and 2, with no advantage in removing acid, as shown in Table A.

TABLE A

|   | Rinse Volume/ Battery | % Acid Removal | Acid Drag out/ Battery | Acid Drag out/ Day | Energy |
|---|---|---|---|---|---|
| 1. Counter Current: 2 stage | 40 cc | 90% | 30 cc | 30 (gal/day) | 0.2 Hp |
| 2. CC + blow off: 2 stage | 40 cc | 99.9% | 3 cc | 3 (gal/day) | 3.0 Hp |
| 3. High pressure spray | 150 cc | 95% | 30 cc | 30 (gal/day) | 5.0 Hp |
| 4. Steam nozzles | 150 cc | 95% | 30 cc | 30 (gal/day) | 10.0 Hp |

In Table B, I have compared the efficiency of acid removal in the slow-flow system using two and three rinse stages, with and without blow-off between stages. The effectiveness of air blow-off in reducing acid drag-out to later stages in apparent.

TABLE B

|   | Stage I Rinse | Blow Off | Stage II Rinse | Blow Off | Stage III Rinse | Blow Off |
|---|---|---|---|---|---|---|
| 1. Counter Current |   |   |   |   |   |   |
| % Acid Left | 33 | X | 11 | X | 3.67 | X |
| % Acid Removed | 67 | X | 89 | X | 96.33 | X |
| 2. Plus Blow-Off |   |   |   |   |   |   |
| % Acid Left | 33 | 3 | 1 | 0.1 | 0.040 | 0.004 |
| % Acid Removed | 67 | 97 | 99 | 99.9 | 99.96 | 99.996 | operating at approximately 10-15 oz. per square inch of dry air pressure. As shown in FIG. 5, the blowers 92,93 have side wedge nozzles 94,95 directed at approximately a 45° angle to the incoming batteries to dry the front and sides, and a top wedge nozzle 96 directed down at approximately a 30° angle in the direction of battery movement to dry the top and rear. Air for all of the blowers 92,93, and 30,40) in the apparatus is supplied by a compressor 98 as depicted in FIG. 1. In the preferred embodiment, air ducts are included in the hood cove (not depicted) to convey air from the compressor to the blowers.

A collecting tank 94 underlies the carrier 12 in the drying section, and is open to tank 62. The water it collects is thus returned to the surge tank 64 in the non-soluble dirt section 18. I have found that it is unnecessary to use external heat in the dryer section 90 under normal conditions, but if operating conditions required heat, it would be provided by radiant heat elements between the blowers 92, 93. Radiant heat is absorbed almost entirely by the battery surfaces, and therefore

OPERATION

The batteries are placed on the carrier and moved in sequence through the rinse stations in the soluble material section. Rinse water circulated from the respective reservoir sections of the collection pan to the rinse stations dilutes the acid and dissolves any salts, then falls back into the collection pan below each rinse station. Water for the rinse is circulated by the respective pumps at 1-2 gpm from the respective reservoir sections of the collection pan to their associated rinse stations. The blow-off between the rinse stations blows any adhering acid solution droplets off of the battery and into the preceding section of the collection pan, thus preventing acid drag out to the later stages.

Fresh rinse water is introduced at 0.1 gpm into the low acidity side of the collection pan, and acid solution is withdrawn at the same rate, 0.1 gpm, from the high acidity side. This creates a 0.1 gpm current across the partition in a direction opposite the movement of the batteries to prevent acid diffusion. The acid solution withdrawn from the system is accumulated in a storage tank, and may be reused because it is concentrated and soap-free. The batteries are then carried in sequence through the non-soluble dirt section, where dirt is removed by a soap rinse and brushes. This rinse water is continuously circulated through particle filters and an acid sponge, so that it is recycled as clean rinse water in a closed system. From the non-soluble dirt section, the batteries are carried in sequence through air blowers which dry the batteries by flowing off the surface water film. The batteries emerge clean and spotless.

It should be understood that various changes in the details, materials and arrangement of parts which have been described above may be made by those skilled in the art within the principle and scope of the invention as expressed in the claims.

What is claimed is:

1. An apparatus for washing external cases of completed storage batteries, comprising:
   (a) a carrier to move the batteries in sequence through the apparatus,
   (b) a rinse section having means to provide a flow of rinse water over the batter cases to remove acid and other water soluble material, said rinse section being located along the carrier in the direction of battery movement,
   (c) a wash section having means to provide a flow of soaped water over the battery cases to remove insoluble dirt from the batteries, said wash section being located along the carrier after the rinse station in the direction of battery movement,
   (d) means for isolating the water in the rinse section from the soaped water in the wash section,
   (e) means for filtering the soaped water used in the wash section to remove insoluble particulate matter, and means for recycling the filtered soaped water for reuse in the wash section, and
   (f) means for collecting rinse water after use in the rinse section for processing as an acid solution.

2. An apparatus as in claim 13, in which the rinse section includes two or more sequential rinse stations, each rinse station having means for applying a slow-flow of rinse water to each battery as it passes through the rinse station.

3. An apparatus as in claim 2, in which the rinse section further includes means for collecting the rinse water from each rinse station in a reservoir associated with that rinse station, and means for pumping water from each reservoir to its associated rinse station.

4. An apparatus as in claim 3, in which the rinse section further includes means for introducing fresh rinse water into the reservoir which is associated with the last sequential rinse station, and means for directing rinse water to flow from the last rinse station's reservoir through the preceding reservoirs to the reservoir associated with the first rinse station, at a rate equivalent to the rate at which fresh water is introduced into the last reservoir.

5. An apparatus as in claim 4, in which said means for extracting rinse water from the rinse section is a means for extracting rinse water from the reservoir associated with the first rinse station at a rate equivalent to the rate at which fresh rinse water is introduced.

6. An apparatus as in either claim 2, 3, 4 or 5, further comprising air blowers associated with each rinse station to blow-off rinse water from each battery before the battery is carried over the reservoir associated with the next rinse station.

7. An apparatus as in either claim 1, further comprising air drying means following the wash section to dry the batteries by blowing air across the battery surfaces.

8. An apparatus as in claim 7, wherein the soaped water contains a wetting agent.

9. An apparatus as in claim 1, wherein the rinse section comprises:
   (i) two or more sequential rinse stations along the carrier, each rinse station having means for applying a slow-flow of rinse water to each battery as the battery passes through the rinse station,
   (ii) a collecting pan underlying the carrier to collect the rinse water, said pan being partitioned between the rinse stations to create a reservoir of rinse water for each rinse station,
   (iii) pumping means associated with each reservoir and its respective rinse station to pump rinse water from the reservoir to its rinse station,
   (iv) means for introducing fresh rinse water into the reservoir associated with the last sequential rinse station,
   (v) means for extracting rinse water from the reservoir associated with the first rinse station at a rate equivalent to the rate at which fresh rinse water is introduced to the reservoir associated with the last rinse station, and
   (iv) means for directing rinse water to flow across the partitions in the collecting pan in a direction opposite to the movement of the batteries at a rate equivalent to the rate at which fresh water is introduced to the reservoir associated with the last sequential rinse station.

10. An apparatus as in claim 9, further comprising an air blower means associated with each rinse station to blow-off rinse water from each battery before the battery is carried over the reservoir associated with the next sequential rinse station.

11. An apparatus as in claims 9 or 10, in which the means for directing rinse water to flow across the partitions comprises the height of the partitions being shorter than the height of the collecting pan.

* * * * *

UNITED STATES PATENT AND TRADEMARK OFFICE
CERTIFICATE OF CORRECTION

PATENT NO. : 5,095,926
DATED : Mar. 17, 1992
INVENTOR(S) : Paul C. Wegner

It is certified that error appears in the above-identified patent and that said Letters Patent is hereby corrected as shown below:

Column 9:

In Claim 1, Line 6, the word "batter" should be "--battery--".

In Claim 2, Line 1, the number "13" should be "--1--".

Signed and Sealed this

Second Day of November, 1993

Attest:

BRUCE LEHMAN

*Attesting Officer*    Commissioner of Patents and Trademarks